United States Patent [19]
Keller et al.

[11] 4,206,654
[45] Jun. 10, 1980

[54] VIDEO DISPLAY CONTROL FOR DIAGNOSTIC SCANNERS

[76] Inventors: John T. Keller, 38137 Poplar Dr., Willoughby, Ohio 44094; Lawrence P. Madson, 6966 S. Eudora St., Littleton, Colo. 80122; Richard P. Kolman, 1487 S. Humboldt, Denver, Colo. 80210

[21] Appl. No.: 952,771

[22] Filed: Oct. 19, 1978

[51] Int. Cl.² .................................................. G01N 29/00
[52] U.S. Cl. ....................................... 73/620; 128/660
[58] Field of Search ................ 73/606, 607, 618, 620, 73/624, 625, 627, 629, 901; 128/660; 340/1 R, 3 R, 5 MP; 358/112

[56] References Cited

U.S. PATENT DOCUMENTS

| 4,058,001 | 11/1977 | Waxman | 73/620 |
| 4,111,055 | 9/1978 | Skidmore | 73/620 |

OTHER PUBLICATIONS

Chow et al., "Digital Processor For Data Compaction and Image Enhancement of Echo Graphical Signals," IBM Tech. Disclosure Bulletin, vol. 17, No. 10, pp. 3154–3158, Mar. 1975.

*Primary Examiner*—Stephen A. Kreitman
*Attorney, Agent, or Firm*—Fay & Sharpe

[57] ABSTRACT

An ultrasonic scanner is disclosed for examining a planar region of a patient. The scanner has a transducer for emitting ultrasonic waves into the planar region of a patient which is defined by an array of subregions separated by subregion boundaries and for transforming echoes received from the planar region into electronic diagnostic values, and an electromechanical device for producing an indication of the position and the angular orientation of the transducer. The scanner also has a main memory having a plurality of addresses corresponding to the subregions for storing such diagnostic value at an address corresponding to the represented subregion, and a CRT display for displaying the diagnostic values stored in the memory. The position indication and angular orientation indication are used for generating the memory address for the diagnostic values corresponding to each echo. The addresses are generated with an analog processor, accumulator and buffer.

18 Claims, 10 Drawing Figures

VIDEO DISPLAY CONTROL FOR DIAGNOSTIC SCANNERS

BACKGROUND OF THE INVENTION

This application pertains to the art of video control circuitry and more particularly to diagnostic scanners incorporating a video output display. The invention is particularly applicable to ultrasonic diagnostic scanners operating in the B scan mode, i.e., examining a planar region of a patient. Although the invention will be described with particular reference to ultrasonic scanning equipment, it will be appreciated that the invention has other applications such as controlling displays from computerized tomographic scanners and other diagnostic equipment which produce video displays and to broader applications incorporating video control circuitry generally.

Video display devices for diagnostic equipment commonly consist of a patient scanning means for scanning the patient and determining diagnostic values corresponding to small incremental subregions of the patient. Diagnostic values, such as accoustic reflectivity or radiation absorption, are derived by the scanner for each subregion. The diagnostic values derived from each pass of the scanner are stored at a plurality of addresses in a memory—each address corresponding to one subregion. Commonly, scanners make a plurality of passes deriving a plurality of diagnostic values for each of many subregions. The plurality of diagnostic values derived for each subregion are generally summed, averaged or compared for substitution with diagnostic values at each memory address.

After sufficient passes, the diagnostic values at each address are used to create a video display. The position in the display is determined by and corresponds to the position of the subregion in the patient. Mathematical analysis of the values, such as convolutions, Fourier transformations, least-squares analysis, and others, may be employed to adjust the stored diagnostic values to improve the quality of the display. The grey tone at each position in the display is related to the magnitude of the diagnostic value at each address.

A standard video display has about 480 parallel scan lines. In a black and white video monitor, each scan line can be cut into most any number of display positions, commonly, called "pixels". For convenience, each scan line has been commonly cut into 512 pixels. This, in turn, requires 262,144 memory addresses which are commonly gained by using a 512×512 memory—a readily purchased electronic commodity.

The display by the nature of video monitors, being a planar rectangular grid of pixels, the subregions of the patient selected are generally chosen to be a planar, rectangular grid of subregions. The rectangular grid is again 512 subregions square.

Oftentimes, a medical diagnostician finds that only a small part of a planar region scanned is of medical interest. Accordingly, the value to the diagnostician of the video display is improved if the smaller region of interest is enlarged for easier viewing. Because the controls for conventional video monitors in diagnostic equipment are generally digital controls, the image commonly can be enlarged only by powers of 2. That is, a diagnostician can view the entire planar region; a quarter of the planar region; an eighth of the planar region, etc.

Conventionally, the controls for video displays for diagnostic scanners use read zoom implementations to enlarge the display size. A read zoom enlarges the display by displaying only a fraction of the diagnostic values stored in the memory but displaying each one a plurality of times. For example, if only a half the memory elements in the X direction and half memory elements in the Y direction are to be displayed the 512×512 memory has effectively been reduced to a 256×256 memory. However, the 256×256 memory is still displayed on a 512×512 pixel video display. Thus, each memory element generates four pixels of video display. Even interpolating the diagnostic values in adjacent memory elements only partially improves the picture. Further, enlargements such as eight or sixteen times form a very coarse display. Further, although the display is enlarged, the resolution is not improved because the same data is displayed only larger.

In ultrasonic diagnostic scanners the subregions which diagnostic value represent, is determined with a system such as that shown in the article by Joseph H. Holmes, William Wright, Edward P. Meyer, G. J. Posakony and Douglass H. Howry entitled "Ultrasonic Contact Scanner for Diagnostic Application", The American Journal of Medical Electronics, Vol. 4, No. 4 pp 147-152 October-December, 1965. In such a system, an ultrasonic transducer is moved across the surface of the patient with a rocking motion to view a planar region therebeneath. As the transducer is moved, it transmits ultrasonic accoustic pulses and receives echoes from tissue interfaces in the body. The strength of an echo is an indication of the accoustic reflectivity of a subregion. The position of the subregion is easily determined geometrically from the position of the transducer, the angular orientation of the transducer, and the length of time from transmission of an ultrasonic pulse to the receipt of each echo. The subregions, position of the transducer and angular orientation of the transducer are commonly referenced in terms of an x,y coordinate system. Conventionally, the processing equipment for deriving appropriate address of the memory for each subregion from the position and orientation of the transducer treats the x position, y position, slope of x, and slope of y values each as independent variables. This is a relatively large number of variables to be processed and requires a large amount of processing circuitry.

Traditionally, in ultrasonic scanners the video monitor is oriented so that the scan of the electron beam is vertical. This entails orienting the video display tube 90° rotated from most other video displays. This is done perhaps because the ultrasonic pulses are transmitted through the body often in a vertical direction or at an angle with respect to the vertical. Further the 512×512 memory produces a roughly square display or 1×1 aspect ratio allowing the top of the screen to be used for displaying textual material such as the patient's name, the date, the scale and other diagnostic information. However, a cross section of the human body is not generally square. Rather, for patients resting on their backs, the cross section is wider than it is high. Thus, the roughly square display is often awkard for displaying planar regions of the human patient.

SUMMARY OF THE INVENTION

The present invention contemplates a new and improved video display control which overcomes all of the above referenced problems and others and provides an easier to use, economical to produce control which improves resolution of the display. In accordance with the present invention, there is provided a video display control which includes a continuously variable analog write zoom. This allows the affected sizes of the subregions of the planar region under examination to be reduced as the display is zoomed to an enlarged scale. In accordance with a more limited aspect of the invention, the memory is modified and the display modified and reoriented to produce a 4×3 aspect ratio which matches the aspect ratio of the human torso.

In accordance with a still more limited aspect of the invention, the coordinate position determining electronics is reduced by handling the x position, y position, x slope and y slope as a pair of independent and a pair of dependent variables rather than four independent variables.

A principal advantage of the invention is improvement of video display images for medical diagnostic purposes. Another advantage of the invention is the simplification and increased versility of the write zoom electronics.

BRIEF DESCRIPTION OF THE DRAWINGS

The invention may take physical form in certain parts and arrangements of parts of preferred embodiment of which will be described in detail in this specification and illustrated in the accompanying drawings which form a part hereof.

DESCRIPTION OF THE PREFERRED EMBODIMENT

Figure 1:
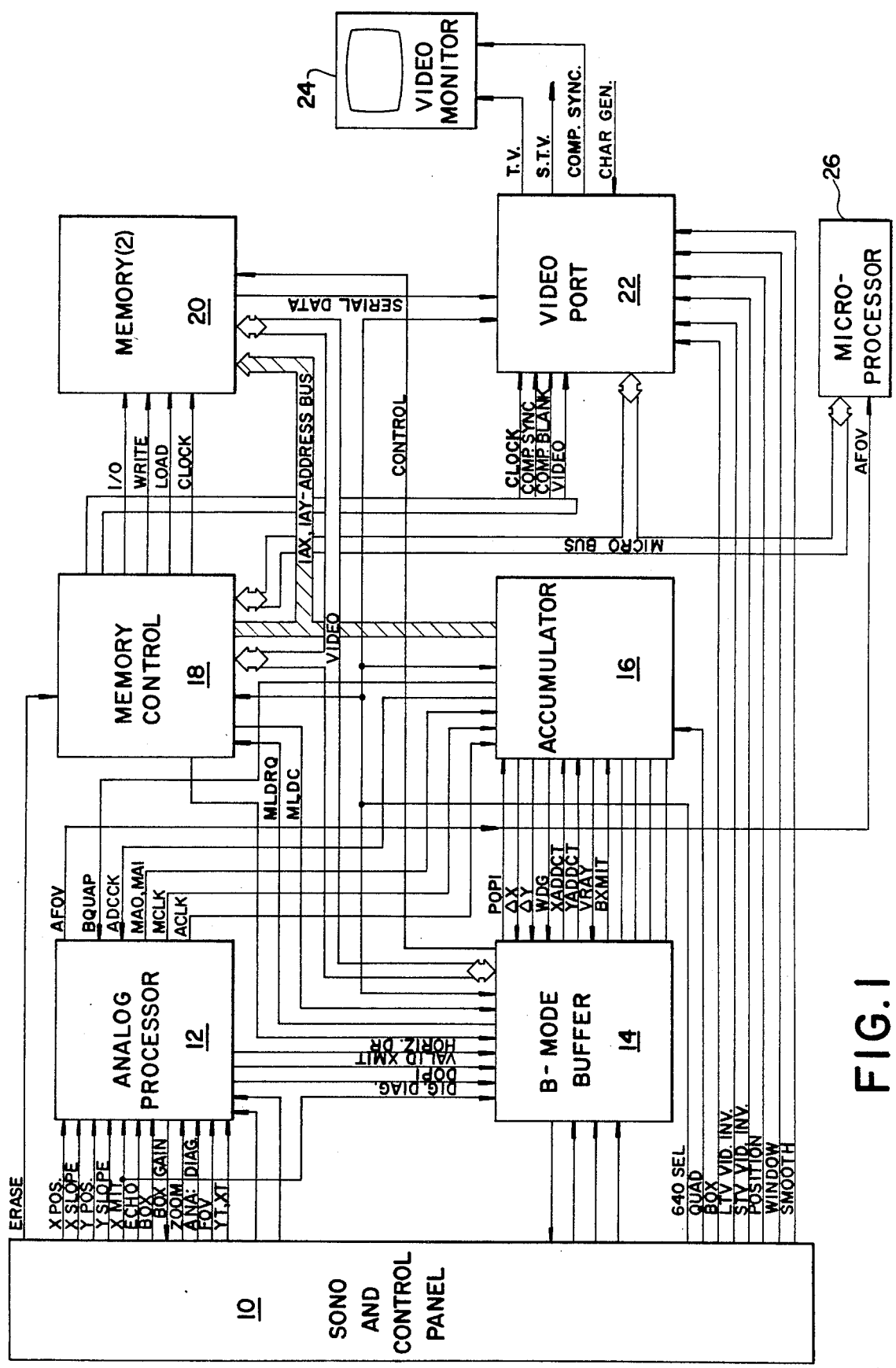
FIG. 1 illustrates a system diagram of a diagnostic scanner in accordance with the present invention.

Referring now to the drawings wherein the showings are for the purposes of illustrating the preferred embodiment of the invention only and not for purposes of limiting the invention. FIG. 1 shows a block diagram of an ultrasonic scanning device including a video display. The system includes a sonographic scanning system 10 which includes the ultrasonic transducer, transducer position and orientation resolving system and a front control panel for the system.

The scanning system produces diagnostic data as a series of diagnostic values; coordinate position data from which the coordinates of the subregion producing each diagnostic value can be derived, and control signals for controlling the mode and manner of transforming the position and diagnostic data into a video display.

In the preferred embodiment the scanner is an ultrasonic scanner. The diagnostic values are the accoustic reflectivity of the subregions. Other scanners which produce different types of diagnostic values may, of course, also be used. Included in the coordinate position data are the coordinate position of transducer, the slope of the transducer, the time of ultrasonic transmission and the time of echo receipt. The control functions include a box positioning control for positioning a box around a next region of interest in a display. A write zoom control causes the next scan of the transducer to produce an enlarged display only of the boxed region or other smaller region. Numerous other control functions are enumerated and alluded to below.

Diagnostic data, position data, transmit and echo timing signals and control signals are conveyed from the sonographic scanning system 10 to an analog processor 12. The analog processor digitizes the analog diagnostic values at a rate of about 8 Mhz.

Further, the analog processor scales the position data in accord with a field-of-view control signal from scanning system 10. It should be appreciated that as the video display is enlarged, the subregions in the planar region examined become smaller. Accordingly, as the ultrasonic pulse traverses the patient, it crosses subregion boundaries more rapidly. The analog processor determines the subregion coordinates for the scale selected corresponding to each digitized diagnostic value and converts the subregion coordinates from analog-to-digital. This digital signal, the digital offset position information or DOPI, is in the preferred embodiment a 14-bit signal. Further, the analog processor provides timing signals MA0, MA1 and MCLK indicating the initial position and slope signals to an accumulator 16.

The digital diagnostic values are conveyed from analog processor 12 to a buffer 14 for temporary storage in a fast memory before being transferred to a slower main memory.

The digital offset position information DOPI are applied to buffer 14. The buffer adjusts these signals to shift the coordinate system describing the subregions, so that the coordinates of the selected group of subregions corresponds with the coordinates displayed by the video display. This transformation produces positionally offset position information, POPI.

The timing signals from the analog processor are conveyed to an accumulator 16. From the timing signals the accumulator generates change in x coordinate signals Δx, change in y coordinate signals Δy, and write data gate signals WDG which are sent to the buffer to show the corresponding positionally offset position information for respective diagnostic values. In response to the Δx, Δy and WDG signals the buffer returns add x count XADDCT signals and add y count YADDCT signals to an address clock in the accumulator. In response to the address clock, the accumulator generates in conjunction with a memory control 18 the actual memory address IAX and IAY each diagnostic value.

The memory control 18 in response to control signals from the control panel provides timing and priority control over memory functions, provides video sync and timing functions, and accesses a main memory 20 for read out.

The main memory 20 stores the diagnostic values for each subregion at a corresponding address and reads out the stored diagnostic values for each pixel of the display.

A video port 22 performs final processing of digital video signals and converts the digital signals to analog for display in a video monitor screen. The final processing includes superimposing of alpha numeric characters or the zoom box on the video display and changing and inverting the grey scale ranges.

A Microprocessor 26 is connected with the memory control and video port to enable the system to produce more sophisticated refinements in manipulation of the data whereby more meaningful diagnostic display can be obtained.

Figure 2:
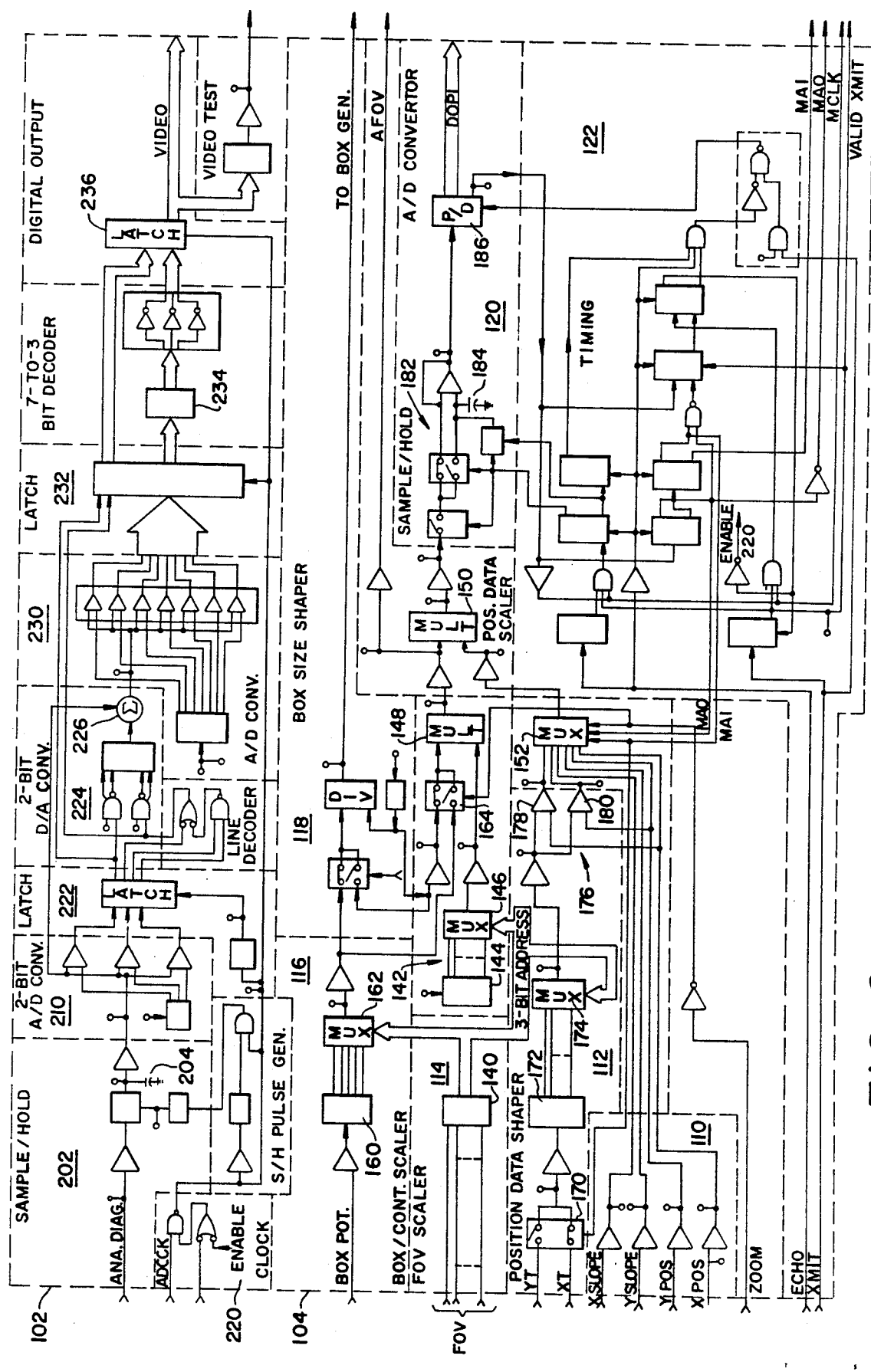
FIG. 2 is a block diagram of the analog processor module of FIG. 1.

The analog processor, shown in FIG. 2, includes a video conversion means 102 for converting analog diagnostic data into a digital representation and a position conversion means 104 for scaling the analog position data and converting it into a digital representation. The position conversion means 104 includes means 110 for receiving data indicative of the x slope, y slope, x position and y position. Also included in the position conversion means is a means 112 for translating the subregion within the planar region of the patient which corresponds to the center of the video display. Means 112 enables the displayed area to be translated across the planar region of the patient until a specific region of interest is centered within the display. Further, the position converter means include a field-of-view decoder means 114 for adjusting the scale of the display. In the preferred embodiment, the field-of-view decoder enables the operator to select among six preselected scales, specifically scales in which the distance from the top to the bottom of the video display is equivalent to 5, 10, 20, 30, 40 or 50 centimeters.

In addition to the field-of-view scaler means 114, which enables the operator to select among preselected discrete scales, is a means 116 for continuously adjusting the scale. Means 116 enables an operator to zoom in on a small region of interest in the planar region displayed to enlarge and clarify it. Regardless of which of the six preselected field-of-view scales are in use the continuous adjustment means can enlarge the scale.

The 5 centimeter scale has a resolution on the order of a tenth of a millimeter. Presently the quality of transducers and other physical limitations of ultrasonic scanning systems make a tenth millimeter an outside limit on resolution. Depending on numerous factors, such as the type of tissue in the region of the patient examined, the frequency of the ultrasonic pulses, etc. around a tenth millimeter of resolution, noise seriously degrades the displayed images. The preferred embodiment limits resolution to a tenth millimeter to accomodate currently available transducers. It is appreciated that the limits on the enlargement controls may be selected greater or lesser than a tenth millimeter resolution.

The position conversion means 104 also includes a box shaper means 118, which in conjunction with means 116 for continuously adjusting the scale, is used to cause a character generator to generate a rectangular outline on the video screen indicating the region which will be examined, if a scan is made with the current zoom setting.

The position conversion means 104 also function to convert the position signals from an analog to a digital format. This conversion is done with an analog-to-digital conversion means 120 which converts the position signals as modified for the translations in the center of the display, for discrete scale adjustments and for continuous scale adjustments from an analog to a digital representation.

Further, the converter includes a timing means 112 which performs a clocking function. In ultrasonic diagnostic scanners, the timing means is triggered by the transmission of an ultrasonic pulse to start a series of clock pulses. Each time an echo is received the time elapsed, i.e. number of clock pulses since the ultrasonic transmission is noted. The elapsed time indicates a distance between the transducer and the subregion which produced the echo. These timing pulses include the MA0, MA1 and MCLK pulses sent to the accumulator 16 and pulses for scaling by the position conversion means 104 for use in deriving the digital offset position information.

Looking now to the details of the position conversion means 104, to operate the scanner the technician first selects a field-of-view or scale of the display, i.e. the size of the area of the planar region of the examined patient to be displayed. This selection is made from the front control panel of scanning system 10 which produces a field-of-view control signal FOV. There are six, in the preferred embodiment, field-of-view lines—one for each discretely selectable scale—connecting the control panel with an encoder 140 in the field-of-view decoding means 114. This encoder transforms signals received on each of the six inputs into a unique 3-bit address designating the selected scale. This 3-bit address is used in performing several scaling functions within the position conversion means 104. For scaling the x and y position and slope signals according to the field-of-view selected, the three bit address of the field-of-view decoder means selects a corresponding multiplication factor. The selection is made from among six multiplication factors, one corresponding to each of the selectable field-of-view scales. This selecting is carried out by an addressable multiplication factor selection means 142 consisting of six voltages forming the multiplication factors and an addressable multiplexer 146 for choosing the voltage corresponding to the selected scale. To generate the six scaling voltages, a reference voltage is applied to an attenuator 144 consisting of a ladder network of resistors which attenuates the reference voltage in several steps to produce six scaling voltages. In response to a receipt of the 3-bit address from encoder means 140, multiplexer 146 selects the attenuated voltage which corresponds to the 3-bit address. The selected multiplication factor is conveyed from multiplexer 146 to a multiplying means 148. The multiplying means multiplies the scaling voltage by a zoom factor from continuous scale adjusting means 116 or by unity if means 116 for continuously adjusting the scale has not been activated. This modification of the multiplication factor will be discussed below. The multiplication factor as modified in multiplication means 148 is conveyed to a multiplying means 150 which multiplies the x and y slope and position signals by the appropriate multiplication factor. In the preferred embodiment, the multiplication means 150 is so connected and the scaling voltages so chosen that the multiplication means 150 multiplies the x and y slope and position signals by the scaling factor to adjust the size and coordinate positions of the subregions. The field-of-view adjusted x and y position and slope analog signals are connected to analog digital conversion means 120.

Means 110 for receiving the x and y slope and position is connected to a multiplexer 152. Multiplexer 152 is clocked by MA0 and MA1 timing signals from timing means 122 to serialize these four types of data and feed them singly to multiplication means 150.

Means 116 for continuously adjusting the scale receives an analog voltage indicative of the scale from the front control panel of the scanning system 10. This enables the scale to be continuously adjusted or zoomed. The analog voltage indicative of the continuously adjustable scaling factor is applied to an attenuator 160 consisting of a ladder network of resistors which attenuates the voltage in steps to produce five graduated output signals. These signals are appropriately scaled to intermesh with five of the field-of-view scales. Although all six field-of-view scales could be further enlarged in the preferred embodiment, the maximum scale is 5 centimeters for both the continuously adjustable scale and the discretely adjustable field-of-view scale. Thus, the 5 centimeter field-of-view scale is not able, by choice of design, to be further enlarged. This is, of course, merely by choice and a sixth output could be provided so that the 5 centimeter scale could be further enlarged. A multiplexer 162 is addressed by the 3-bit address from encoder 140 to select the appropriately scaled outputs from the ladder network 160 of the zoom factor for the field-of-view selected. The continuously adjustable scaling factor as adjusted for the selected field-of-view scale from multiplexer 162, is conveyed to a switching means 164 in the field-of-view scaler means. This switching means is controlled from the front control panel to assume one of two states depending on whether the means 116 for continuously adjusting the scale is actuated. As reference above, switching means 164 selects either a unity value or the zoom factor as one of the inputs to multiplication means 148. Thus, by operating the continuously variable zoom control, the operator affects the multiplication factor which is selected for weighting the x and y slope and position signal to adjust the subregion sizes.

The zoom factor is also connected to means 118 for shaping a rectangular box on the display corresponding to the size of the zoomed field-of-view relative to the instant display. The zoom factor chosen by multiplexer 162 forms an index for a box generator which generates a rectangular box of appropriate size on the display. A compatible box generator will be discussed in conjunction with FIG. 8 below.

Means 112 for translating the center of the display is likewise connected to the front control panel of scanning system 10. This means receives an analog voltage corresponding to the displacement in the x direction and an analog voltage corresponding to the displacement in the y direction. These two signals are connected to a switching means 170 which acts as a multiplexer to serialize the x and y offset values in time coordination with the MA1 timing signals. The x and y translation analog input signals are again applied across an attenuator 172 comprising a ladder network of resistors to produce six scaled analog translation outputs one coordinated with each of the six field-of-view scales. Again a multiplexer 174 which is addressed with the 3-bit address from the encoder 140 selects the appropriate attenuated form at the x or y translation output from among the six signals for the field-of-view scale chosen.

The selected translation output is conveyed to a means 176 for superimposing the x or y translation on the x or y position signal. This means includes a differential amplifier 178 for combining the x position signal received by means 110 with the x translation to produce a translated x position signal. Similarly, the y position and translation signals are combined in another differential amplifier 180 to produce a translated y position signal. The translated x and y position signals are connected with multiplexer 152. Multiplexer 152 receives a control input from the control panel of scanning system 10 indicating whether the translated or untranslated x and y position signals are to be serialized and conveyed to multiplying means 150.

Thus, the output of multiplier means 150 represents x and y coordinates appropriately translated and scaled for the fixed field-of-view scale and the continuously variable zoom scale. Thus, the output signals from multiplier 150 represent an appropriate scaling of the subregions so that each subregion corresponds to one display pixel in the scale chosen for viewing. In the preferred embodiment, the subregions vary from a tenth millimeter square for the 5 centimeter scale to one millimeter square for the 50 centimeter scale.

Analog-to-digital conversion means 120 includes a sample and hold means 182 which receives the output of multiplying means 150. The sample and hold means connects a storage means such as a capacitor 184 with multiplier means 150 for a sufficient duration that the capacitor becomes charged to a voltage equal to the instantaneous voltage output of multiplier means 150. With a steady state voltage on capacitor 184, the capacitor is disconnected from multiplier means 150 and connected with analog-to-digital converter means 186. The steady state voltage on capacitor 184 is converted by a fourteen bit analog-to-digital converter 186 to a 14-bit digital representation, referenced above as the digitally offset position information (DOPI) which is conveyed to buffer means 14.

Looking now in detail to the diagnostic value processing part of the analog processor and in particular the video converter means 102 for converting analog diagnostic data to a digital, representation, there is provided a video speed analog-to-digital conversion means. This conversion means receives logarithmically compressed diagnostic data from scanning system 10 and produces a series of 5-bit digital video data words at about an eight megahertz rate. Video conversion means 102 includes a sample and hold means 202 which receives analog diagnostic data. The sample and hold means connects a storage means such as capacitor 204 with scanning system 10 for a sufficient duration that the capacitor becomes charged to a voltage equal to the instantaneous voltage representing diagnostic data. After a sufficient time for capacitor 204 to reach a steady state value, it is disconnected from scanning means 10 and connected with a 2-bit analog-to-digital converter 210 for transforming the steady state analog voltage on capacitor 204 into a digital representation.

A clock means 220 controlled in part by a series of enable signals from timing means 122 clocks the video converter means 102. Clock pulses periodically cause storage means 204 to be connected and disconnected from the analog diagnostic data and synchronize the various converters and latches to be described below.

The succession of steady state voltages on the storage means 204 are each converted by 2-bit analog-to-digital converter 210 to the two most significant bits of the digital representation. The two most significant bits are stored temporarily in a latch 222.

The 2-bit analog-to-digital converter approximates the analog signal as the 2-bit binary signal. However, the 2-bit binary signal is not of the accuracy desired. In most instances there is an error between the actual analog signal and the 2-bit digital output. To further refine the digital output, this error in approximating the analog signal is a 2-bit digital output is isolated and the isolated error used in additional analog-to-digital converters to determine the less significant bits of the initial analog diagnostic data. This is achieved by using a 2-bit digital to analog converter 224 which converts the two most significant digital bits into an analog signal representing the two bits exactly. The analog diagnostic data from sample and hold means 202 is subtractively combined in a summing node 226 with the analog output from the 2-bit digital to analog converter 224 in order to isolate the analog signal corresponding to the error in approximating the analog diagnostic data as the two most significant bits.

The isolated error signal from summing node 226 is transformed by an analog-to-digital flash converter 230 to a 7-bit digital representation. In the flash converter 230, the analog error voltage is compared with seven regular incremented reference voltages to form a series of seven highs and lows which represent the number of referenced voltages which the error signal exceeds. These seven highs and lows form the 7-bit signal.

The 7-bit signal and the 2-bit most significant bits from latch 222 are stored in a 9-bit latch 232. The seven bits are coverted from a string of seven sequential highs and lows by an encoder 234 to a 3-bit binary representation. The 3-bit binary representation and the two most significant bits from latch 232 are conveyed to a 5-bit latch 236. The output of the 5-bit latch forms a 5-bit video word indicative of the diagnostic data.

In this way the video converter means converts analog diagnostic data which in ultrasonic diagnostics is generally log compressed and gain scaled into a 5-bit digital representation. In the preferred embodiment, a 5-bit digital representation is formed from the analog diagnostic data every 125 nanoseconds. The 5-bit digital representation was chosen for its ability to produce 32 grey shades on the video display. A larger or smaller number of bits can be used to increase or decrease the number of different grey scales. Of the numerous shades of grey a video monitor can produce, the average human eye can differentiate only about 20 shades.

Figure 3:
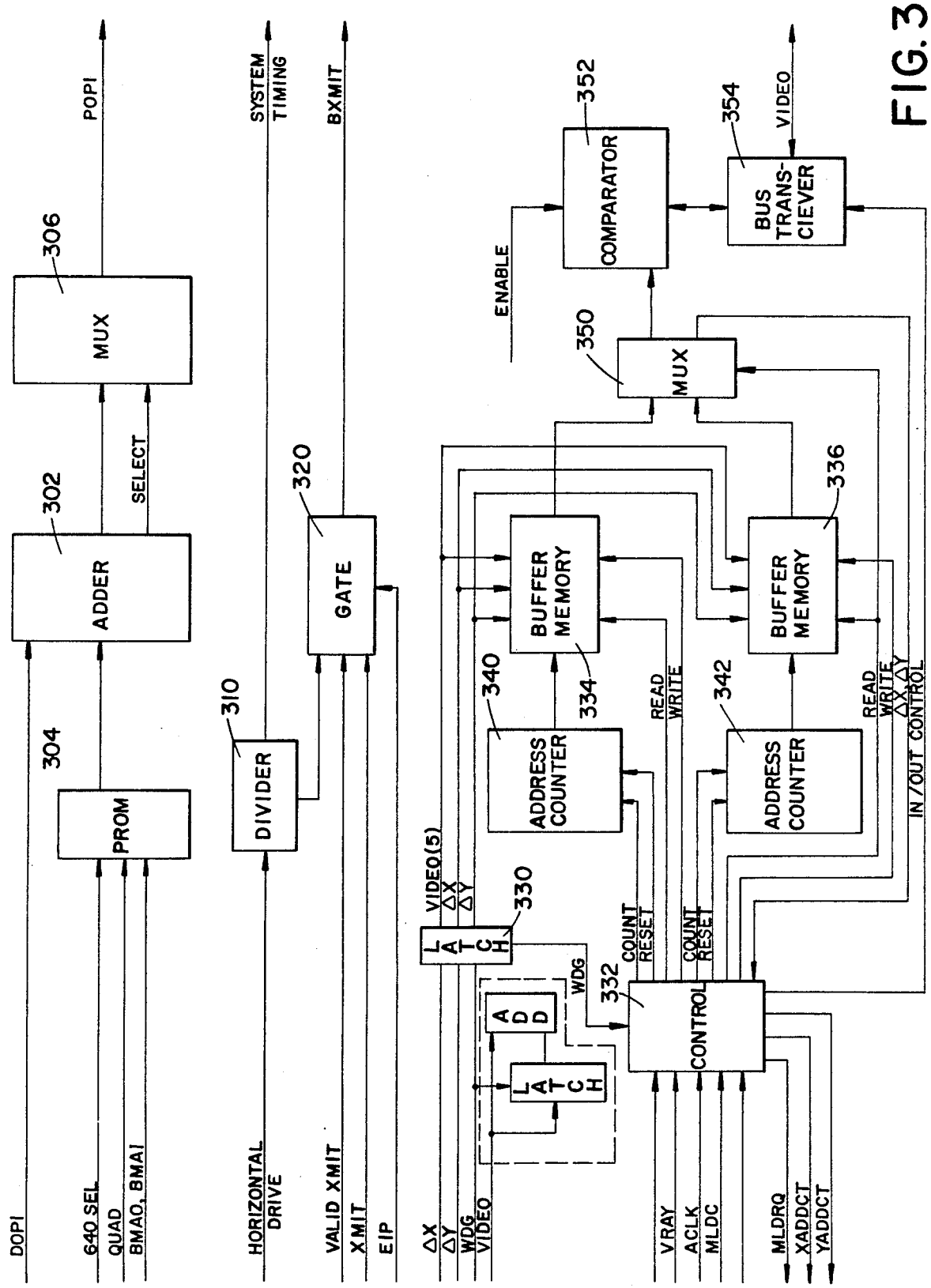
FIG. 3 is a block diagram of the B-mode buffer of FIG. 1.

FIG. 3 shows details of buffer 14. The 14-bit digitally offset position information from analog-to-digital converter 120 is received by an ADDER 302. The ADDER 302 combines the position information with a signal from a PROM 304. PROM 304 is addressed from the front control panel of scanning system 10 to select an appropriate position offset to be added to the position information. The position offset translates the subregion or scanner coordinate system to match the coordinate system of the video display and selects for a square 512×512 display, a rectangular 512×640 display, or a multiple image display. In the scanner coordinate system the center of the transducer field-of-view is arbitrarily assigned the 0,0 coordinate, whereas the video monitor works only in the positive quadrant, i.e. the lower left hand corner is assigned 0,0. PROM 304 supplies the appropriate offset to achieve this coordinate transformation. Further, in the preferred embodiment either a 512×512 main memory or a 512×640 main memory may be selected. The 512×640 memory produces a 512×640 array of generally square pixels forming a display with a 4×3 aspect ratio. Another feature of the preferred embodiment is a control signal, QUAD, to the PROM 304 from the front control panel changing the format of the video display from a single image to four images each in one quarter of the video display. This requires different offsets be applied to the position information. Similarly, other offset signals may be desirable in other circumstances. It may, for example, be desirable to have a six or nine image format of the video monitor. The positionally offset information is serialized by a multiplexer 306 to form positionally offset position information signals, POPI. For other modes of display such as an A scan, multiplexer 306 can be controlled to vary position signals selected and their order.

Also in buffer 14 is a means for generating a system timing signal. This includes a divider 310 which receives a horizontal drive signal from the memory control 18. Divider 310 divides this timing signal by one of a plurality of division factors. These factors vary with mode of operation. For the B mode display, a division factor 16 has been found desirable. Other division factors such as 20 for the TM mode may be used.

The buffer further includes a means for enabling the system to write on the video screen. This means includes a GATE 320. The GATE 320 produces an enable signal, BXMIT, to the accumulator to enable writing on the screen. This enable signal is in response to a valid transmit signal received from the analog processor 12 which enables the display of a B mode display. Alternately, the GATE may be operated by a transmit signal which enables the display for a TM scan. Another control for GATE 320 is an erase in progress signal, EIP, from memory control 18. This signal blanks the video screen by inhibiting the enable circuit from GATE 320 to the accumulator during an erase cycle in order to prevent interference from appearing on the screen. Other controls such as from divider 310 which may be used in the A mode display may be used to control GATE 320.

The buffer further includes a pair of buffer memories which operate simultaneously but out of sequence so that one reads data into the slow speed main memory while the other receives high speed data from the analog processor. The system is actuated in response to a signal VRAY from the accumulator 16 indicating that there is a valid ultrasonic transmission and a correct positioning of the ultrasonic transducer. Each valid ray signal indicates a new transmission of an ultrasonic pulse from the transducer and reverses the functions of the two buffer memories.

As an ultrasonic pulse travels through the planar region of a patient, it crosses subregion boundaries. At a slope between vertical and 45°, the pulse crosses subregion boundaries more rapidly in the y direction than in the x direction. Similarly, at angles between horizontal and 45° the pulse crosses subregion boundaries more rapidly in the x direction. By definition the boundary crossed most rapidly, either x or y, is chosen as the independent variable and the other the dependent variable.

From the slope or orientation of the transducer a ratio of the crossing of boundaries in the independent variable direction to the crossing of boundaries in the dependent variable direction is readily determined. In stepping through a rectangular grid, such as the display pixels, this ratio indicates the number of pixels stepped along one axis relative to the other. For example, a ratio of 2:1 indicates that after a first step is taken in the independent direction and the corresponding pixel address no step is taken in the dependent direction. When a second step in the independent direction is taken because of the 2:1 ratio, a first step is taken in the dependent direction.

Thus, it will be appreciated that for each ultrasonic pulse, the x and y coordinates of all the diagnostic values need not be known. Rather, only the independent variable, the above ratio, and changes or crossings of the pixel boundary in the independent variable direction need be known. From these three factors, all the x,y coordinates can be recreated.

The buffer memory function uses this principle to reduce the required memory capacity. The buffer memories each are addressed only by the independent variable, to address the storage location of each 5-bit digital video data word. Further, along with the five video data bits, a sixth bit is stored indicating whether the present video word represents a position a subregion displaced in the x direction from the previous data word, $\Delta x$. Similarly, a seventh bit is stored indicating whether the data word represents a position a subregion displaced in the y direction, $\Delta y$. This enables each buffer memory to be a smaller $1 \times 1024 \times 7$ memory rather than the larger $512 \times 640 \times 5$ main memory.

The 5-bit video data words from the analog processor 12 are received by a latch 330. Also received by latch 330 are signals from accumulator 16 indicating the crossing of a subregion boundary in the x direction, $\Delta x$, and the crossing in the y direction, $\Delta y$. Additionally, a write data gate signal, WDG, is received from accumulator 16 indicating the independent variable. The WDG signal, as will be shown in the detailed discussion of the accumulator below is the same as the one of $\Delta x$ or $\Delta y$ signals which is the independent variable. Latch 330 collects these signals and produces a 7-bit output for storage in the buffer memories—five bits of video data, one bit for $\Delta x$ and one for $\Delta y$. The WDG signal is conveyed through latch 330 to a control means 332.

The control means 332 controls the address generators for the buffer memories and the read/write functions of the memories. Each time an ultrasonic pulse is transmitted by the transducer a valid ray signal, VRAY, is received by control means 332 from the analog processor. In response to the VRAY signal, the control means reverses the read/write functions of the buffer memories.

The two buffer memories referenced 334 and 336, each receive 7-bit signals from latch 330 for storage and either a read enable or a write enable signal from control 332. One buffer memory writes in the data produced in response to an ultrasonic pulse while the other reads out to the main memory the data produced in response to the preceding ultrasonic pulse. Because the ultrasonic transducer pulses with a periodicity on the order of a kilohertz, there is sufficient time for data to be read from a buffer memory to the main memory before the buffer memory is required to write in another ultrasonic pulse of data.

Connected between control means 332 and buffer memories 334 and 336 is a means for addressing the buffer memories. This means includes an address counter 340 for addressing buffer memory 334 and an address counter 342 for addressing buffer memory 336. Upon receiving a VRAY signal control means 332 resets the address counter for the memory in the write mode. Thereafter, upon receiving each video word, the control means 332 is clocked by clock signal, ACLK from the accumulator 16. In response to the clock signal, and WDG the control means 332 steps the address counter one step. This causes the address from the address counter to the buffer memory to change by one address, hence, changing the storage location for the 7-bit signal from latch 330.

After a memory is loaded with data from one ultrasonic pulse, control means 332 sends a memory load request signal, MLDRQ, to the memory control 18. If the main memory is ready to load, a memory load signal, MLDC, is sent to control means 332.

A multiplexer 350 receives the data read out of the one of the buffer memories which is in the read mode. The multiplexer divides the seven stored bits, conveying the five video data bits to a comparator 352 and conveying the $\Delta x$ and $\Delta y$ bits to control means 332. Upon receiving each $\Delta x$ signal, the control means 332 produces an add one x count signal, XADDCT, conveyed to accumultor 16 for use in changing the address in the main memory to which the video data is conveyed. Similarly, the $\Delta y$ signals cause control means 332 to produce an add one y count signal YADDCT, which is conveyed to accumulator 16 for use in changing the address in the main memory.

Comparator 352 receives new video data from multiplexer 350 and the video data already stored in the main memory at the corresponding main memory address from a bus transceiver 354. Comparator 352 compares these two magnitudes and returns the larger to transceiver 354 for return to the main memory. Alternately, comparator 352 may be replaced with a circuit for averaging the new video data with the already stored video data in a weighted manner.

Figure 4A:
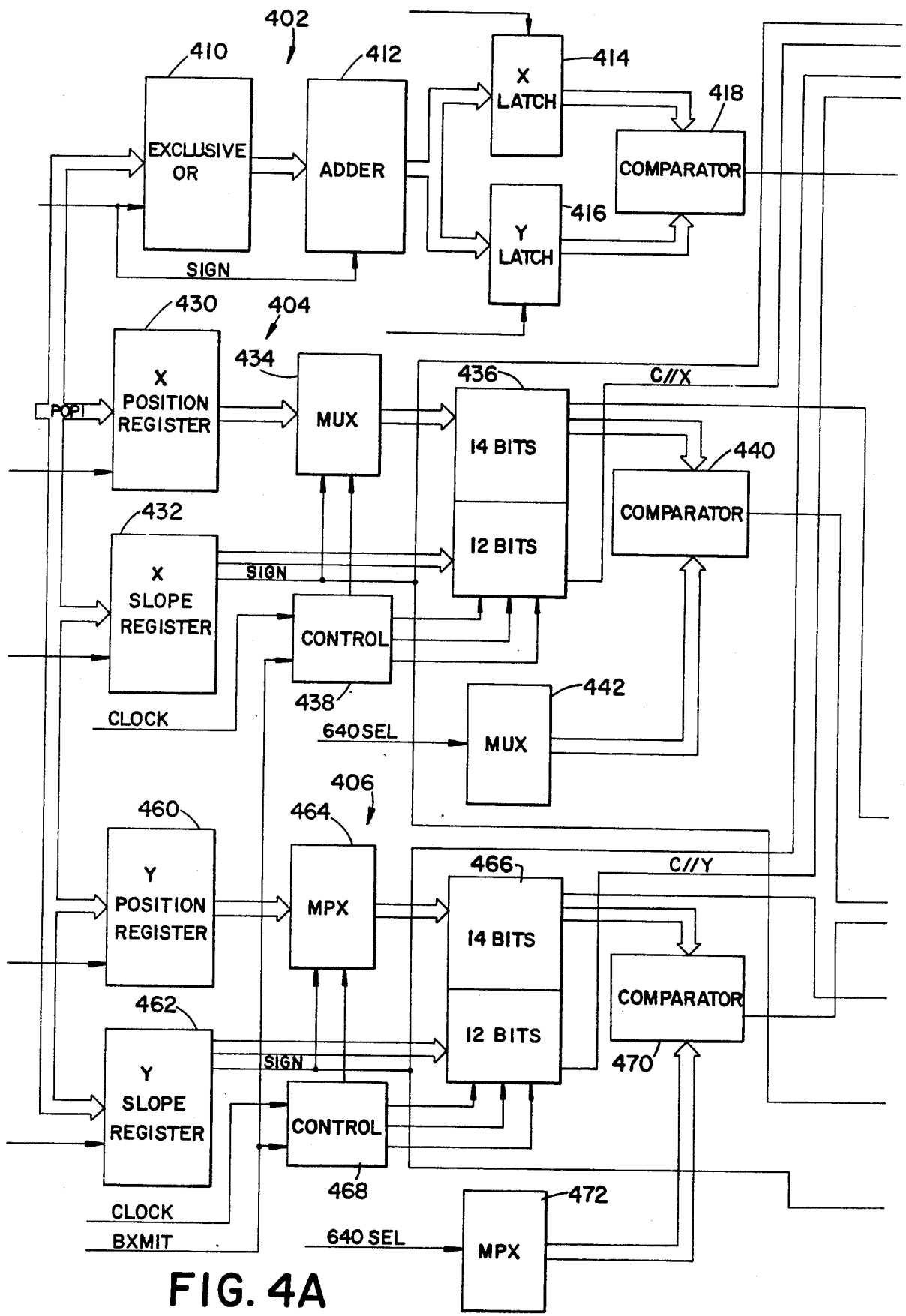
FIGS. 4A and 4B are a block diagram of the accumulator of FIG. 1.
Figure 4B:
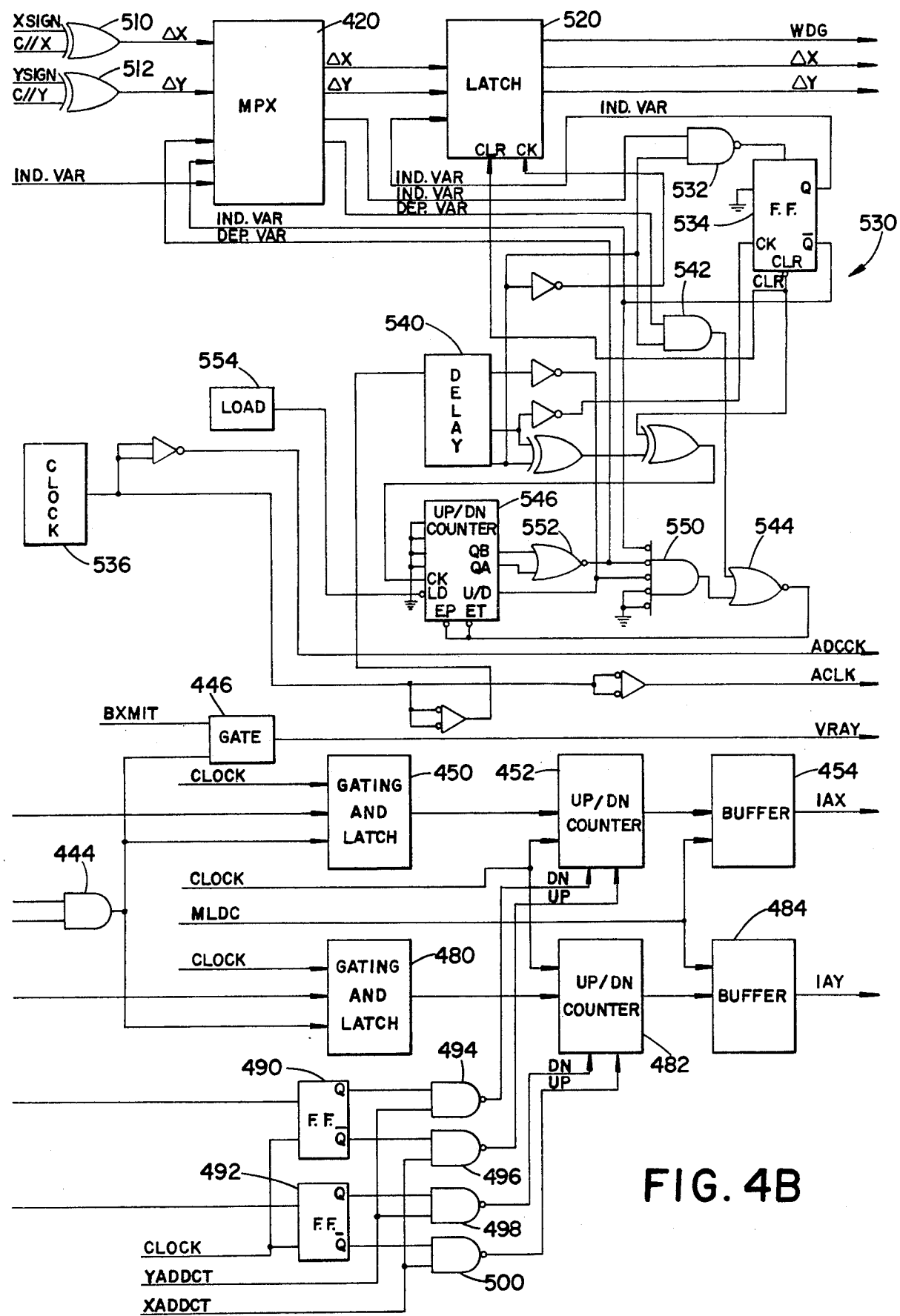

FIGS. 4A and 4B show the accumulator 16 which receives positionally offset position information, POPI, from buffer 14 and produces the $\Delta x$, $\Delta y$ and the WDG signals which the buffer uses in producing add count x and add count y signals, XADDCT and YADDCT. The XADDCT and YADDCT signals are received by accumulator 16 for use in generating addresses for the main memory 20.

The positionally offset position information signals are received by a means 402 for determining whether the x or y coordinate is going to be the independent variable and by a means 404 for determining a starting x coordinate for video data from each ultrasonic pulse and by a means 406 for determining a starting y coordinate for video data from each ultrasonic pulse.

The means 402 for determining the independent variable determines whether positionally offset position information signals for each ultrasonic pulse are changing more rapidly along the x or y coordinates and selects that coordinate for the independent variable. Changes in the dependent variable coordinate are thereafter determined from the ratio of the rate of change in the x and y directions and the changes in the independent variable.

Twelve bits of positionally offset position information signals from buffer 14 form one input to twelve exclusive OR gates 410. The other input of each EXCLUSIVE OR gate is formed by the 13th-bit of the positionally offset position information signal which is indicative of the sign. From the EXCLUSIVE OR gates 410, the outputs are sent to an adder 412 which separates the positionally offset position information into x and y components. The x component is held in a latch means 414 and the y component in a latch means 416. A comparator 418 compares the slope or rate of change of the x component from latch 414 and the slope or rate of change of the y component from latch 416 and produces an output signal indicating whether the x or y component is changing more rapidly; that is, whether x or y is the independent variable. The selected coordinate to be the independent variable is conveyed to a multiplexer 420 and forms one input thereof. The functioning of multiplexer 420 will be explained in more detail below after its other inputs have been discussed.

Positionally offset position information signals conveyed to the means 404 for determining the x starting coordinate are received by an x position register 430 and an x slope register 432. Position register 430 registers the x coordinate position of the transducer at the time of pulsing the ultrasonic transducer. A multiplexer 434 conveys the x coordinate position received to 14 bits of a 26 bit accumulator 430. Multiplexer 434 receives a select signal from a control means 438 and the sign extension from the x slope register 432. As the ultrasonic pulse traverses the patient, the x coordinate of the position within the patient determines which diagnostic values represent changes. Each time a new ultrasonic pulse is generated, BXMIT from the B mode buffer 14 causes control means 438 to load the initial values of x position from register 430 and x slope from register 432 into the accumulator 436. If the x slope value is positive, the sign extension from register 432 presented to multiplexer 434 and subsequently to the top fourteen bits of accumulator 436 will be zero. This condition will add one to the x coordinate value stored in accumulator 436 each time an x coordinate boundary is crossed. If the x slope value is negative, the sign extension from register 432 presented to multiplexer 434 and subsequently to the top fourteen bits of accumulator 436 will be one. This condition will subtract one from the x coordinate value stored in accumulator 436 each time an x coordinate boundary is crossed. As the ultrasonic pulse traverses the patient, the x coordinate of the position within the patient determines which the diagnostic values represent changes. The next x coordinate is compared by a comparator 440 with the boundaries which are displayable on the video screen. The boundaries of the displayed region are supplied by a multiplexer 442 in accordance with a selection signal from the front panel, selecting the 512×512 or the 512×640 format. If the next x coordinate is within the boundaries, an enabling signal is sent to an AND gate 444.

The 6 bits of the most significant starting x coordinate position from accumulator 436 are fed to a gating and latching means 450 which is the initial x starting address for use in producing addresses in the main memory 20. Gating and latching means 450 is enabled by AND gate 444 if both the x and y coordinates are within the display boundary. The gating and latch means 450 is connected with an up/down counter 452 which is incremented with each crossing of a pixel or subregion boundary when main memory 20 is loaded. Each crossing in the positive x direction increases the count, and in the negative x direction decreases the count. Whether the signal is traversing x in the positive or negative direction is determined by other circuitry discussed below. Each time the up/down counter 452 counts, it conveys the new count to a buffer 454 which forms a new x address, IAX, on the address bus line connected with memory 20.

The slope register 432 registers the slope or angular orientation of the transducer. The slope is expressed as a ratio of the rate of video word generation to the rate of change in the x direction. It is expressed as a fraction less than one. Accumulator 436 is clocked by control means 438 with each video word generation to add the slope fraction to the value in a reserved 12-bit section of the accumulator. The fractions are so chosen that each time an x coordinate is crossed, the sum in the accumulator crosses 1. The crossing of this sum produces an x carry signal c//x for use in generating the Δx signal.

Similarly, the positionally offset position information signals are received by a y position register 460 in a y slope register 462. Again, a y starting position is conveyed by a multiplexer 464 to 14 reserved bits of the 26-bit digital accumulator 466. Multiplexer 464 receives a select signal from control means 468 and sign extension from the y slope register 462. As in the x accumulator, the initial y position and y slope values are loaded in accumulator 466 by control means 468 upon receipt of BXMIT from the B mode buffer 14. A control means 468, actuated by a clock from the analog processor 12, again controls multiplexer 464 and accumulator 466 so that a rate multiplier is again formed in which each time the sum of the fractional parts crosses 1, a y carry signal c//y is produced. The next y position from the 14-bit position signal in accumulator 466 is fed to comparator 470 which compares position signal with boundary signal from a multiplexer 472 to determine whether or not the present subregion of the patient is within the display area. If the next y position is within the display region, AND gate 444 receives an enable signal. If the next subregion is within both the x and y boundaries, AND gate 444 receives two enable signals and, in turn, enables gating and latch means 450 and 480. This coincidence gated with BXMIT produces the signal VRAY.

The six bits of the starting y address are conveyed to gating and latch means 480 which again is enabled only when both the x and y addresses are within the viewing area of the monitor. The y addresses received by gating and latch means 480 within the display area are conveyed to an up/down counter 482 which counts up each time the y address changes by the equivalent of one pixel in the positive direction and down each time the y address changes by one pixel in the negative direction when main memory 20 is being loaded. The count from counter 482 is fed to a buffer 484 and conveyed to the address bus for generating addresses IAY, into main memory 20.

Whether x and y addresses to main memory 20 are increasing or decreasing is determined for up/down counters 452 and 482 from the x sign signal, from the x slope register 432, from the y sign signal, from the y slope register 462 and from the add x count and add y count signals from buffer 14. The x sign signal forms one input to a first flip-flop 490 and the y sign signal forms one input to a second flip-flop 492. Both flip-flops also receive clocking pulses. The Q output of flip-flop 490 and the add y count signal from buffer 14 form the inputs to a NAND gate 494, the output of which forms the decrease x signal to counter 452. Similarly, the NOT Q output of flip-flop 490 and the add x count from buffer 14 form the inputs of another NAND gate 496, the output of which forms the increase x signal. Similarly, the Q and NOT Q outputs of flip-flop 492 each form one input, respectively, of NAND gates 498 and 500 while the add y count and the add x count signals form the other inputs, respectively. The outputs of NAND gates 498 and 500 form the decrease and increase y signals, respectively, for counter 482.

The x sign signal from slope register 432 and the x carry signal from accumulator 436 each form an input to an EXCLUSIVE OR gate 510. Similarly, the y sign and y carry signal each form the input to another EXCLUSIVE OR gate 512. When the slope is positive, a carry signal will occur only when a pixel boundary is crossed. However, when the slope is negative, a carry signal is produced by the accumulator with every pulse except when a pixel boundary is crossed. Accordingly, the EXCLUSIVE OR gates 510 and 512 are used to transform these two opposite, but equivalent, indications of the crossing of a pixel boundary into a uniform indication of the boundary crossing. These pixel boundary crossing signals x and y form inputs into multiplexer 420 along with the independent variable signal from comparator 418. As explained above, the independent variable is either $\Delta x$ or $\Delta y$, whichever comparator 418 determines to be changing most rapidly. These three signals are conveyed to a latch 520 which is clocked to produce the above discussed write data gate, WDG, signal, the $\Delta x$ signal and the $\Delta y$ signal for buffer 14.

As the system is designed, the independent variable changes more rapidly than the dependent variable. If this expectation is not met, errors may occur. When the orientation of the transducer is very close to 45°, round off errors in accumulators 436 and 466 in producing the carry x and carry y signal may, from time to time, cause a dependent variable to appear to vary more rapidly than the independent variable. To preclude the dependent variable from appearing to change more rapidly than the independent variable, a dependent variable control means 530 is provided. This means allows only one pixel boundary crossing signal in the dependent variable direction to be generated for each pixel boundary crossing signal in the independent variable direction. If a second or additional apparent boundary crossing signal in dependent variable direction occurs, the additional signal is stored until such time that two crossing signals in the independent variable direction occur without intervening crossing signal in the dependent variable direction. At that time, the stored crossing signal in the dependent variable direction will be inserted to preserve the appropriate ratio of independent-to-dependent variable direction, crossing signals.

Means 530 includes a NAND gate 532 which receives a delayed clock pulse on one input and pixel boundary crossing signals in independent variable direction on the other input for presetting a flip-flop 534. The delayed clock pulse is generated by a clock 536, such as an eight megahertz oscillator, which is connected indirectly to a delay line 540. The output of the delay 540 forms the delayed clock input to NAND gate 532. The boundary crossing signals in the dependent direction and the delayed clock pulse from delay 540 form the inputs of an AND gate 542. Coincidence of the clock and a dependent variable boundary crossing signal causes an output pulse from AND gate 542 to a NOR gate 544. Each time there is no coincidence on the inputs of NOR gate 544, it will enable an up/down counter 546 to count up one count. Each time a dependent variable boundary crossing signal is produced by multiplexer 420, counter 546 counts up one count. Each time an independent variable boundary crossing signal is produced, flip-flop 534 produces an output which is returned to an input of multiplexer 420 to indicate an independent variable boundary crossing signal has been sent to latch 520 and to form one input to an AND gate 550. Other inputs to AND gate 550 include an enable signal from the up/down counter which is produced in response to each up count and an enable signal from a NOR gate 552 whose input again comes from the up/down counter 546. The output of NOR gate 552 indicates that a dependent variable boundary crossing signal has been conveyed to an input of multipliexer 420 from counter 546. In this manner, each time a dependent variable boundary crossing signal is conveyed from multiplexer 420, AND gate 542 and OR gate 544 cause counter 546 to count up one count. And each time an independent variable crossing signal is conveyed from multiplexer 420, flip-flop 534 with AND gate 550 and OR gate 544 causes counter 546 to count back down one count. Upon counting down one count, an output signal is produced indicative of the temporarily stored dependent variable boundary crossing, which indication is conveyed to the input of multiplexer 420. Accordingly, if two dependent variables crossing signals are conveyed before a second independent variable boundary crossing signal is conveyed, up/down counter 546 will count up two numbers. Then, upon the next occurrence of an independent variable boundary crossing signal, the up/down counter will count down one number transferring a dependent variable boundary crossing indication to multiplexer 420. As long as the ratio of independent-to-dependent variable boundary crossing signals remains, one-to-one counter 546 counts up and down between 1 and 2. However, when an independent variable boundary crossing signal is conveyed, not followed by a dependent variable boundary crossing signal, the stored count in up/down counter 546 at that time will be counted out of counter 546 and into multiplexer 420. Also connected to up/down counter 546 is an input 554 connected to the analog processor to receive a load signal each time an ultrasonic beam is transmitted from the transducer into the patient. This load signal zeroes counter 546.

Figure 5A:
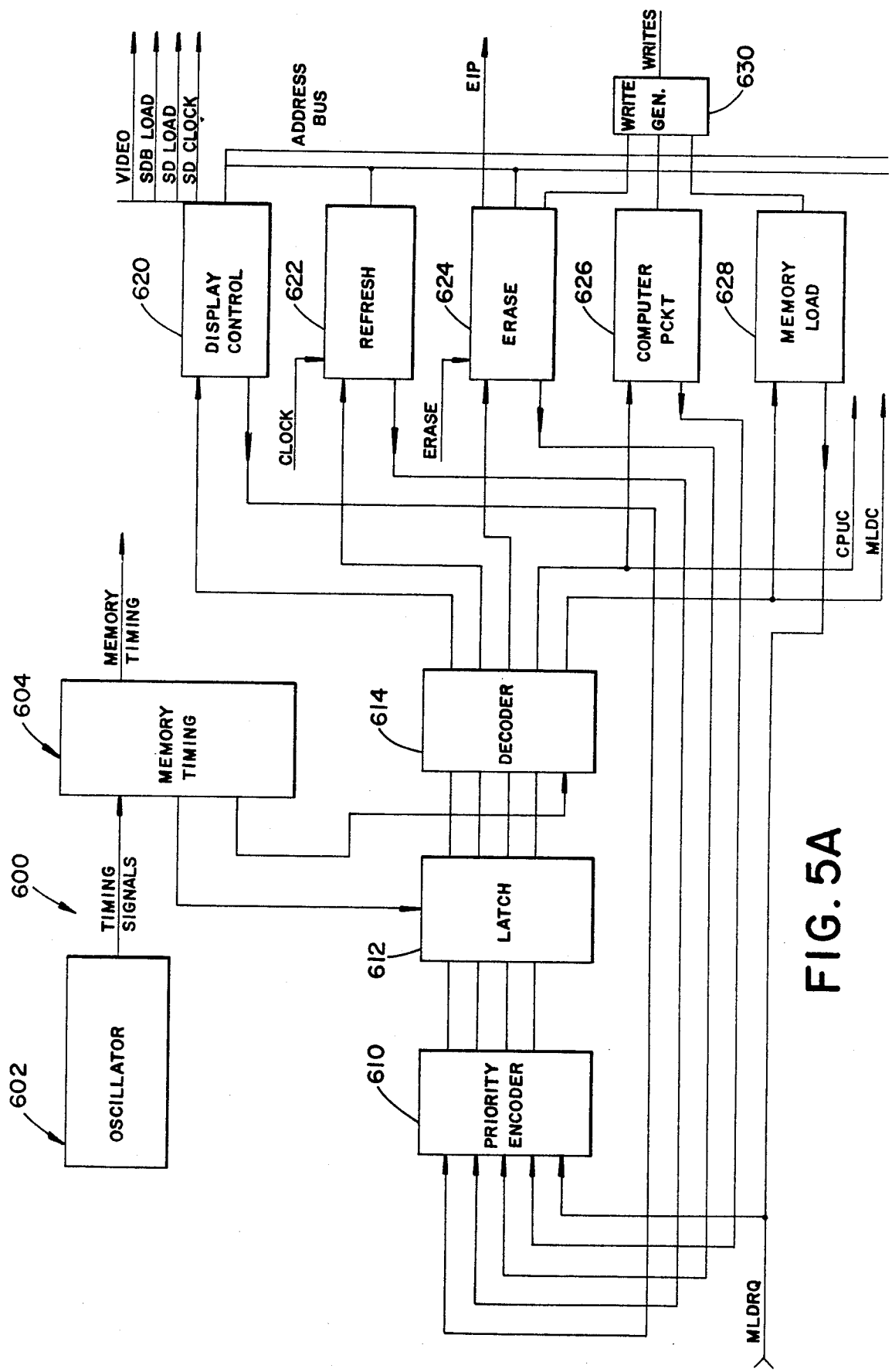
FIGS. 5A and 5B are a block diagram of the memory control of FIG. 1.
Figure 5B:
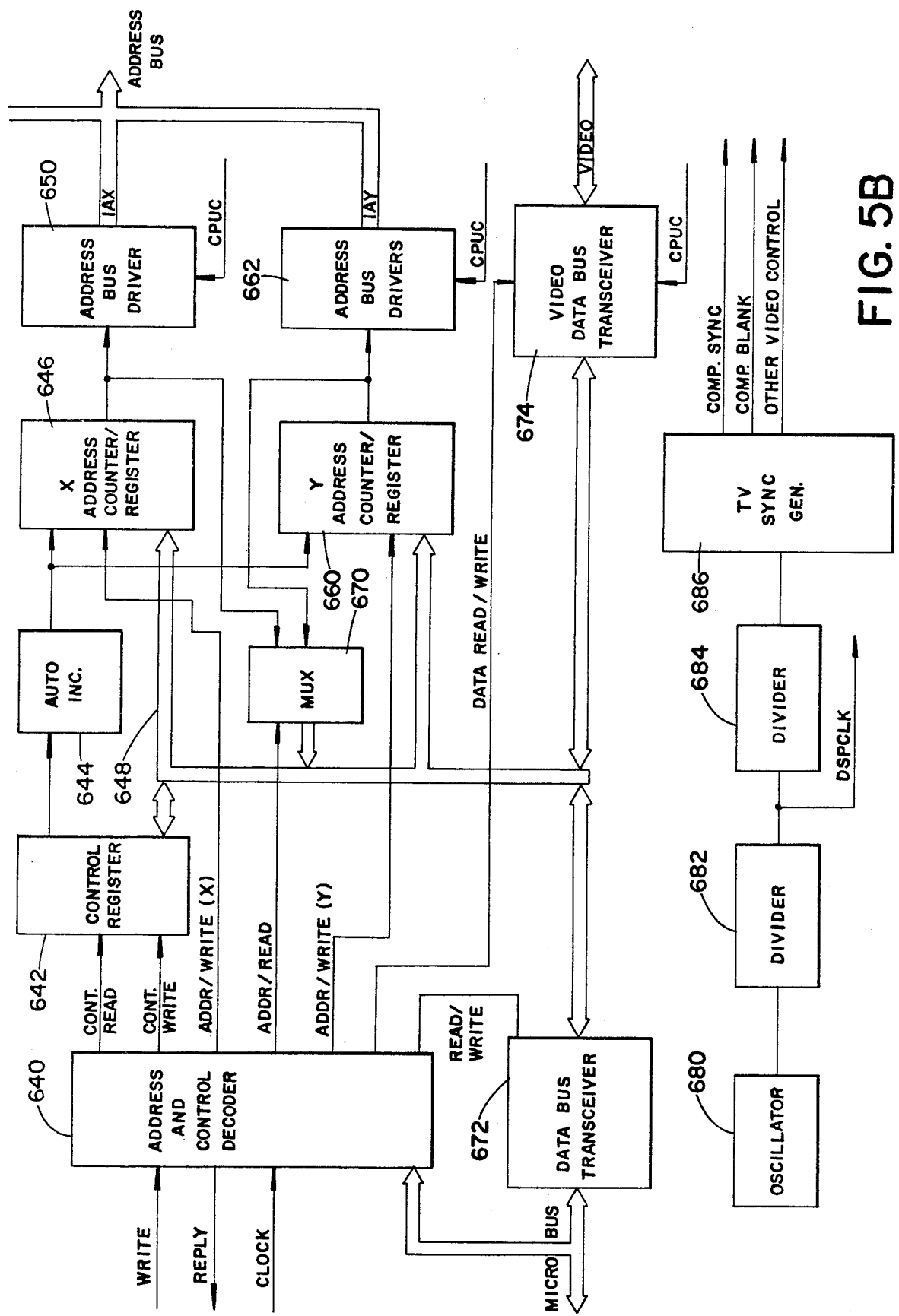

Shown in FIGS. 5A and 5B are details of memory control means 18. Memory control includes a means 600 for producing memory timing signals. This means includes an oscillator 602, such as a delay line oscillator, with a cycle time on the order of 500 to 600 nanoseconds. Timing signals from the oscillator are conveyed to a memory timing means 604 which shapes and modifies timing signals to produce a plurality of timing signals for main memory means 20.

Also included in the memory control is a priority encoder 610 which receives a series of request signals for special display formats, such as display control, refresh, erase, computer port, and memory load. Priority encoder 610 produces an encoded output to a latch 612 which is gated by a timing signal from memory timing means 604. Latch 612 temporarily stores the encoded signal for reading by a decoder 614. Decoder 614 is cycled by memory timing means 604 to produce display control, refresh, erase, computer port, and memory load control signals. Connected to decoder 614 to receive the control signals are display control means 620, refresh means 622, erase means 624, computer port means 626, and memory load means 628. In response to the control signal, each of these means generates the appropriate sequence of addresses onto the address bus. Further, each of these means, upon completing their sequence of addresses, produces a request signal for the corresponding function which is returned to reset the priority encoder 610.

Memory control means 18 includes a display control means 620 for generating the addresses and control signals for main memory 20 to read out the stored diagnostic data to the video port. Display control means 620 generates signals serial data buffer load (SDB load), serial data load (SD load), and serial data clock (SD clock) which act on a special portion of main memory 20, described later to allow serialized video data words to be applied to the video port 22. The signal video is also generated which gates the serialized video data to the video port 22.

Included in memory control means 18 is a circuit means 622 which provides refresh addresses to main memory 20. This insures that data stored in main memory 20 is not destroyed.

Memory control means 18 includes a means 624 for generating erase addresses and write signals to write zeros into main memory 20 to erase previously stored ultrasound data.

Memory control means 18 includes a computer port means 626 which gives the microprocessor access to the main memory 20 for retrieving and/or altering data stored in main memory 20. The microprocessor accesses the main memory through an address and control decoder means 640, and a data bus transceiver 672. By proper selection of control codes an x address counter/register 646 and a y address counter/register 660 are accessed to set up a unique x,y coordinate in main memory 20. The addresses set up in registers 646 and 660 may be read back into the microcomputer through a multiplexor 670 and data bus transceiver 672. The microprocessor may also access a control register 642 through means 640 and 672 to set up the control modes for an x and a y counter/registers 646 and 660. The microprocessor can read or write specific data points from main memory 20 through transceiver 672 and a video data bus transducer 674. When proper codes are set up in control register 642, each time a data point is read or written by the microcomputer the x or y address will increment after the read or write operation.

A memory load means 628 is also included. The actual circuitry is located on the B mode buffer 14. This means allows the buffer memories to be loaded into main memory 20 through bus transceiver 354 located on the buffer 14. Each memory load cycle MLDC will advance the buffer being read out by one address. Internal codes in the buffer memories 334, 336 tell control means 332 that main memory 20 is loaded and no more memory load cycles are generated.

Another part of the control is a TV or video monitor control means including an oscillator 680 on the order of 24 ½ megahertz. The frequency produced by oscillator 680 is divided by a divider 682 to produce clock pulses for controlling memory means 20. These clock pulses are used for synchronizing the read-out of video data from the memory 20 with the sweep and scan timing of the video monitor. A second divider 684, again, reduces frequency of oscillator 680 to produce a timing signal for controlling a TV sync generator 686. The TV sync generator produces a series of video control signals including composite sync, composite blanking, horizontal drive, vertical drive, odd field, and even field video control signals.

Figure 6:
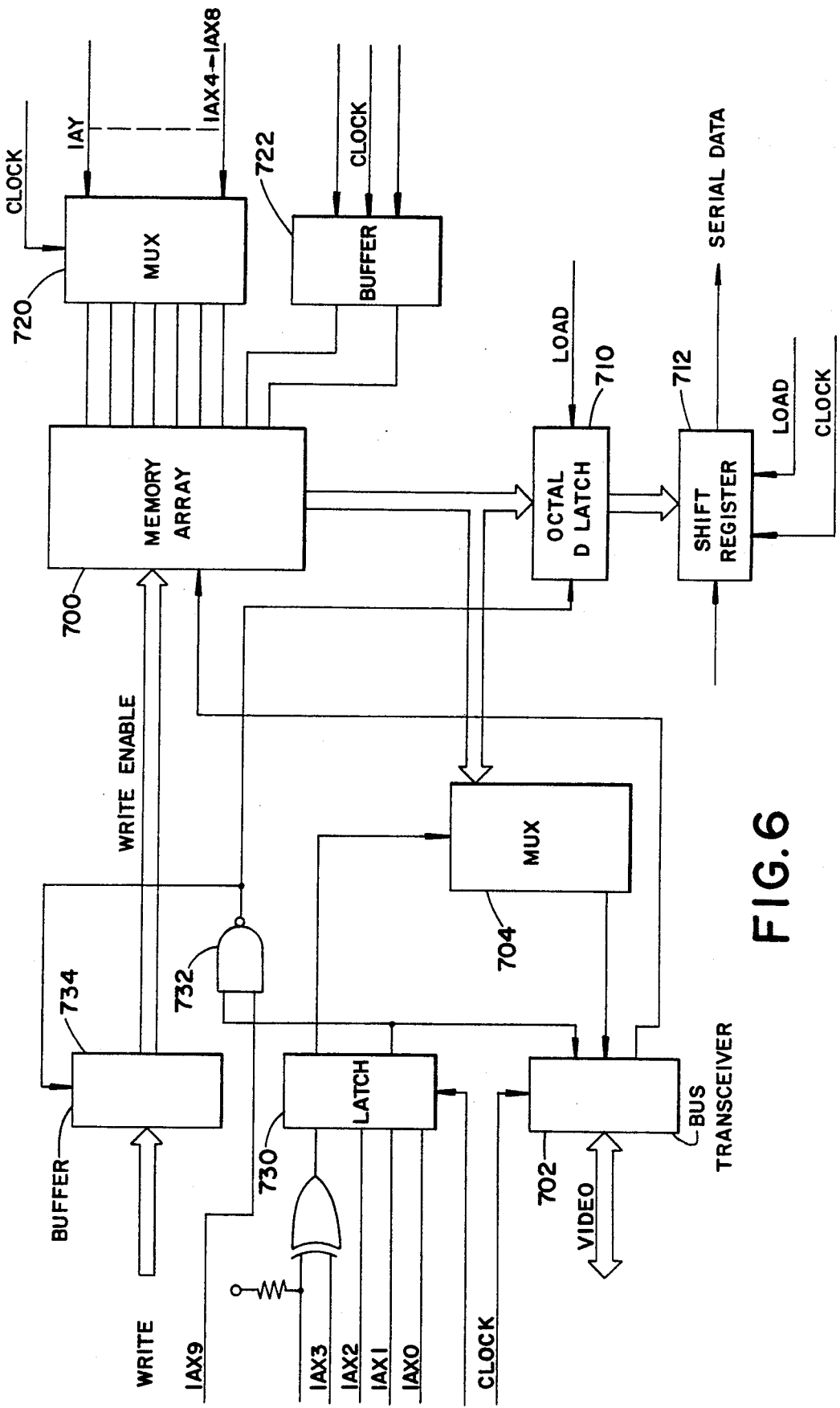
FIG. 6 is a block diagram of the memory of FIG. 1.

Details of main memory means 20 are shown in FIG. 6. The heart of the memory means is a memory array 700 which, in the preferred embodiment, is a 512×640×5 RAM memory. This enables the memory to store five bits of diagnostic data corresponding to an array of 512×640 subregions or pixels. Other memory sizes, of course, may be used.

The five bits of diagnostic data are received from the video data bus by a bus transceiver 702. Bus transceiver 702 conveys the five bits of video data to the memory array 700 in time with a clock pulse to coordinate with the appropriate main memory address signals.

Diagnostic data stored in the memory array 700 is addressed out to a multiplexer 704. Multiplexer 704 returns stored diagnostic data to bus transceiver 702. Thus, bus transceiver 702 receives the new diagnostic data from the video data bus and corresponding data already stored in memory array 700. In response to a control signal, transceiver 702 selects one or the other of the values to become the stored data in the memory array at each address.

The stored data read from memory array 700 is also conveyed to an octal D latch 710. Data signals are gated through latch 710 by appropriate gating signals into a shift register 712. Shift register 712 also receives appropriate load and clocking signals to reset the shift register and the clock data therethrough to serialize the video data for display.

The y main memory addresses, IAY, from address bus driver 662 and a part of the x main memory address from address bus driver 650 in memory control means 18 are conveyed to a multiplexer 720 in main memory means 20. Multiplexer 720 multiplexes these address signals to generate partially the addresses within the memory array 700 to which the diagnostic data from the data bus is being conveyed. Multiplexer 720 is clocked to synchronize the address with the corresponding diagnostic data. A buffer 722 receives the clock pulses from the memory timing means 604 of the memory control means for clocking memory 700 to coordinate the flow of data.

The remaining x main memory addresses are generated within main memory means 20. The remaining x address signals from the x address bus driver 650 of the memory control means are received by a latch 730. Latch 730 produces enable signals for multiplexer 704 and bus transceiver 702. Additionally, it provides one input to AND gate 732, which receives an x address signal as a second input. The output of NAND gate 732 provides an enable signal to octal D latch 710 and to a buffer 734. Buffer 734 recieves an 8-bit write signal to produce a 16-bit write enable signal for use in conjunction with addressing memory array 700.

Figure 7:
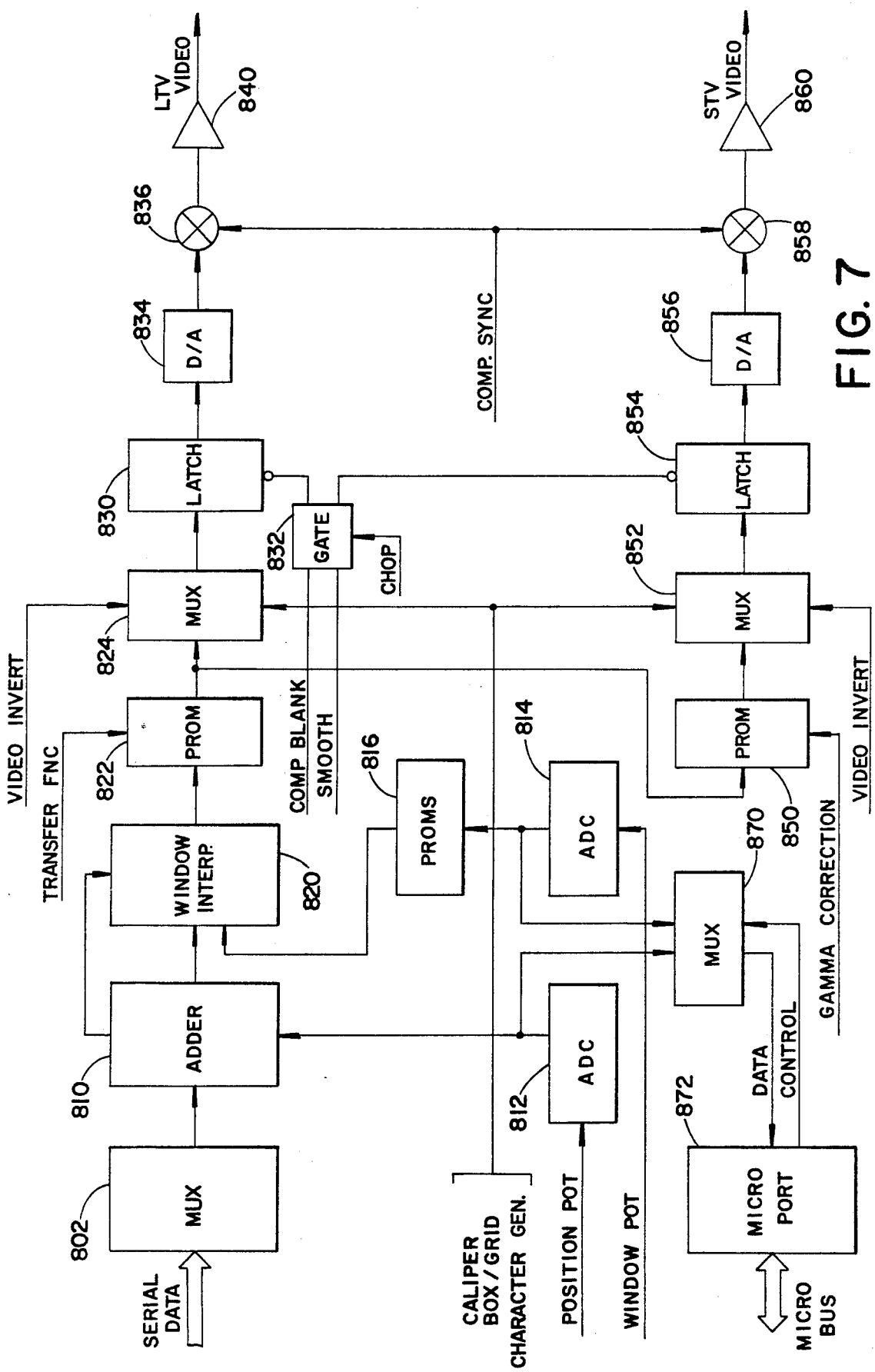
FIG. 7 is a block diagram of the video port of FIG. 1.

Video port 22 is shown in greater detail in FIG. 7. When main memory means 20 is in the read mode, diagnostic data stored in the individual 5-bit memory elements of memory array 700 is fed serially through shift register 712 to a multiplexer 802 of the video port. Multiplexer 802 also may receive calibration and test video signals. The data selected by multiplexer 802 for viewing is conveyed to an ADDER 810. ADDER 810 adds a digital offset signal received from an analog-to-digital converter 812 to the serial data for the purpose of shifting the position of display of the video gray scale information on the video screen. The analog-to-digital converter 812 receives an analog signal from the position potentiometer on the front control panel.

In addition to the gray scale position discussed above, the system include a gray scale window control. The window potentiometer controls an analog-to-digital converter 814, the output of which is applied to a window interpolator 820. This interpolator adjusts the number of gray shades displayed. The number of shades are adjustable continuously from 1 to 32.

Video data from window interpolator 820 is conveyed to a PROM 822 where they may be adjusted by a transfer function. The adjusted video data are conveyed to a multiplexer 824 which superimposes on the video data other video signals such as from a character generator, a box generator, a grid generator, a caliper generator, etc. Also, the multiplexing order of multiplexer 824 can be controlled to invert the video image.

The video data from multiplexer 824 are conveyed to a latch 830 which is gated by a gate means 832 in response to composite blanking and smoothing signals. As a video data is gated through latch 830, it is converted from digital-to-analog by a digital-to-analog converter 834. Composit sync signals are added to the analog video signals by an adding means 836. After amplification by an amplifier 840, the signals are conveyed to a large TV or video monitor such as would be viewed by the diagnostician.

Signals from PROM 822 are also conveyed to a PROM 850 which performs a gamma correction function. The gamma corrected video signals from PROM 850, along with the other video signals such as from a character, box, or caliber generator, are conveyed to a multiplexer 852 for superimposing as selected. From multiplexer 852, the video signals are conveyed to a latch 854 which is again gated by gate 832. Digital video signals gated through latch 854 are converted by a digital-to-analog converter 856 to analog video signals and combined in an ADDER 858 with composite sync signals. The synced analog data is amplified by an amplifier 860 and conveyed to a small TV or video monitor such as would be coupled with a photographic camera for recording the display. The gamma correction of PROM 850 may be varied to match the photographic film used.

The digital signals generated by analog-to-digital converters 812 and 814, in response to the position and window signals from the control panel, are conveyed to a multiplexer 870. A microcomputer bus port 872 controls multiplexer 870 to cause it to feed the position or window signals to the microcomputer bus port on command. Microcomputer bus port 872 interfaces with the microcomputer bus port for sending this data to the microcomputer.

Figure 8:
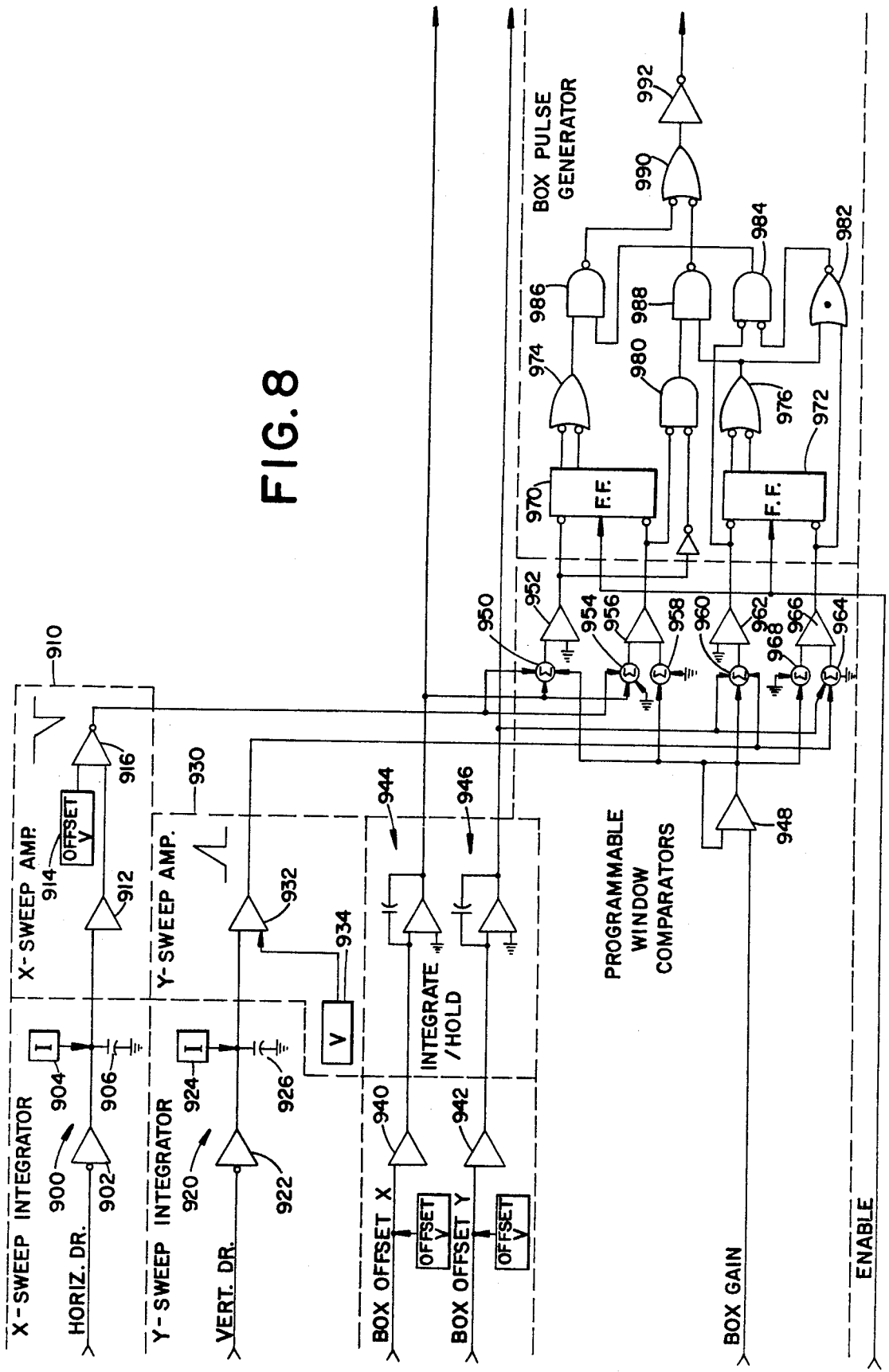
FIG. 8 is a block diagram of a box generator.

FIG. 8 shows the details of the box generator. The box generator includes an x sweep intergrater 900 including an amplifier 902 which amplifies a horizontal drive signal, a constant current source 904 and an integrating capacitor 906. The integrated x sweep signal is amplified by an x sweep amplifier means 910 which includes an amplifier 912, a source of an offset voltage 914 and a unity gain inverting amplifier 916 which receives the outputs of amplifier 912 and offset voltage 914 to produce the negative voltage indicative of the x sweep.

Analogously there is a y sweep intergrater 920 again including an amplifier 922, constant current source 924, and integrating capacitor 926. The integrated y sweep is conveyed to a y sweep amplifier 930 in which an offset voltage 934 is combined with the integrated sweep voltage in amplifier 932 to produce positive y sweep indication.

To position the box on the video display, x and y box offset signals are received and amplified respectively by amplifiers 940 and 942. The amplified x and y offset signals are conveyed to x and y integrate and hold circuits 944 and 946, respectively.

The size of the box is determined by a box gain signal from box shaper 118 which is adjusted by a differential amplifier 948. A summing node 950 sums the outputs of the x sweep amplifier, the x integrate and hold circuit and the box gain amplifier to form one input of a differential amplifier 952 which functions as an x comparator. The outputs of the x sweep amplifier and the x integrate and hold are summed at another summing node 954 with a ground signal to produce one input of a second differential amplifier 956 which acts as another x comparator. The second input of differential amplifier 956 to which the first sum is compared is obtained from a summing node 958 which combines the box gain with a ground signal.

Similarly, a summing node 960 sums the output of the y sweep amplifier, the y integrate and hold circuit and the box gain amplifier to produce one input of a differential amplifier 962. The amplifier 962 compares this sum with the ground signal to function as a y comparator.

Similarly, another summing node 964 sums the output of the y sweep amplifier, the y integrate and hold circuit to form one input of the differential amplifier 966 which acts as another y comparator. A summing node 968, which sums the output of box gain amplifier 948 with a ground signal, compares the second input to differential amplifier 966 with which the voltage at summing node 964 is compared. The outputs of differential amplifiers 952 and 956 are conveyed to a monostable flip-flop 970. Similarly, the outputs of differential amplifier 962 and 966 are conveyed to another monostable flip-flop 972. An enable signal generated when the zoom or box function is to be used, enables flip-flops 970 and 972, respectively. Outputs of flip-flop 970 are conveyed to an OR gate 974 to produce an output which the series of x pulses. Analogously, outputs of flip-flops of 972 are conveyed to an OR gate 976 to produce a series of y pulses.

The output of differential amplifier 952 is inverted and gated with the output of differential amplifier 956 in an AND gate 980. The output of differential amplifier 966 is conveyed to a NOR gate 982 for gating with the output of OR gate 976. The output of NOR gate 982 is gated with the output of differential amplifier 962 in an AND gate 984. The output of AND gate 984 is gated with the x pulses from OR gate 974 in a NAND gate 986.

Similarly, the y pulses from OR gate 976 are gated with the output of AND gate 980 in a NAND gate 988. The x and y pulses, which are passed by NAND gate 986 and AND gate 988, are conveyed to an OR gate 990 whose output is amplified by an amplifier 992.

Thus, as the x and y coordinate positions are indexed at which coordinates of the box should appear, a pulse is conveyed through gate 990.

The invention has been described with reference to the preferred embodiment. Obviously, numerous modifications and alterations will occur to others upon reading and understanding this specification. It is our intention to include all such modifications and alterations insofar as they come within the scope of the appended claims or the equivalents thereof.

The invention claimed is:

1. In an ultrasonic scanner comprising a transducer for emitting ultrasonic waves into at least a planar region of a patient defined by an array of subregions separated by subregion boundaries and transforming echoes received from said planar region into electronic diagnostic values, means for producing an indication of the position of said transducer, means for producing an indication of the angular orientation of said transducer, a memory means having a plurality of addresses corresponding to the subregions for storing each diagnostic value at an address corresponding to the represented subregion, display means for displaying the diagnostic values stored in said memory means and memory address generating means receiving the position indication and angular orientation indication for generating the memory address for the diagnostic values corresponding to each echo, the address generating means comprising:
- an analog processor comprising means for receiving analog position indication; means for receiving analog angular orientation indications, analog-to-digital conversion means for converting analog position indications and analog angular orientation indications into a digital representation, said analog-to-digital conversion means operatively connected with the analog position indication receiving means and the analog angular orientation receiving means, and timing means for producing timing signals indicating the interval beween each ultrasonic emission and the receipt of echoes;
- an accumulator including means for producing from said digital representation and said timing signals a signal indicating the crossing of a subregion boundary, said accumulator operatively connected with said analog processor to receive said digital representation and said timing signals;
- a buffer including buffer memory means for temporarily storing said diagnostic values and said subregion boundary crossing signals in at least one memory, said buffer means operatively connected with said analog processor and said accumulator means; said buffer including means for separating said diagnostic values from said boundary crossing signals, said separating means operatively connected to said memory means; means for transferring said diagnostic values to said main memory, said transfer means operatively connected with said separating means and said main memory; means for producing counting pulses in response to each boundary crossing signal, said counting pulse means operatively connected with said separating means;
- said accumulator further including main memory address generating means for generating a main memory address for each diagnostic value transferred from said buffer memory means to said main memory means by said transfer means, said address generating means operatively connected with said analog processor for receiving the digital representation to determine a starting address and operatively connected with said buffer for receiving said counting pulses to change the address for each boundary crossing.

2. The apparatus as set forth in claim 1 wherein said analog processor means further includes means for altering the boundaries of the subregions to modify their size, said altering means operatively connected with said analog position indication receiving means, said analog angular orientation receiving means and said analog to digital conversion means.

3. The apparatus as set forth in claim 2 wherein said boundary altering means comprises serializing means for serializing analog position indications and analog angular orientation indications to produce a series of position and angular orientation indications; means for generating a scaling factor related to the size modification of the subregions; means for multiplicatively combining said scaling factor with said series of position and angular orientation indications, said combining means operatively connected with said scaling factor generating means, said serializing means and said analog-to-digital conversion means.

4. The apparatus as set forth in claim 3 wherein said scaling factor generating means includes a plurality of sources of preselected scaling factors; a first addressable selection means for selecting one of said plurality of preselected scaling factors, said addressable selection means operatively connected with said plurality of sources; and an addressing means for addressing said selecting means to cause the selection of one of said preselected scaling factors.

5. The apparatus as set forth in claim 4 wherein said scaling factor generating means further includes a continuously variable scaling factor source; a means for incrementally altering continuously variable scaling factors, said altering means operatively connected with said continuously variable scaling factor source for receiving the continuously variable scaling factor therefrom and producing a plurality of altered scaling factors; a second addressable selecting means for selecting one of said plurality of altered scaling factors, said adressable selecting means operatively connected with said altering means to receive the altered scaling factors and operatively connected with said addressing means to be caused thereby to select of one of the altered scaling factors; and second combining means for multiplicatively combining said preselected scaling factor and said altered scaling factor, said second combining means operatively connected with said first and second selecting means to receive selected preselected scaling factors and selected altered scaling factors and operatively connected with said first combining means to supply scaling factors thereto.

6. The apparatus as set forth in claim 3 wherein said scaling factor generating means includes a continuously variable scaling factor source whereby any scaling factor in the range of the continuum is selectable.

7. The apparatus as set forth in claim 1 wherein the boundaries of the array of subregions are defined by a coordinate system having at least a first and a second coordinate whereby the positions of the transducer subregions, and boundaries are describable in terms of said first and second coordinates and wherein the angular orientation is describable in terms of the rates of change of the first and second coordinates; and
- wherein the accumulator further includes slope comparing means for comparing the rate of change of the first coordinate and the rate of change of the second coordinate to determine which has the higher rate of change, said coordinate with the higher rate of change being the independent coordinate and the other coordinate being the dependent coordinate; and
- wherein said boundary crossing signal producing means produces a first coordinate direction boundary crossing signal and a second coordinate direction boundary crossing signal and an independent coordinate boundary crossing signal whereby the independent coordinate boundary crossing signal is the same as the faster changing of the first and second coordinate boundary crossing signal; and
- wherein said buffer memory means includes a buffer memory address generating means for generating a buffer memory address in response to each said independent coordinate boundary crossing signal whereby the buffer memory stores temporarily at each of a plurality of addresses, a diagnostic value, an indication of the presence or absence of a first coordinate direction boundary crossing signal, and an indication of the presence or absence of a second coordinate direction boundary crossing signal; and
- wherein the means for producing counting pulses produces first coordinate counting pulses and second coordinate counting pulses in response to each indication of the presence of a first and second respectively coordinate direction boundary crossing signal from said separating means.

8. The apparatus as set forth in claim 7 wherein said boundary crossing signal producing means further includes a first producing means for producing an independent coordinate boundary crossing signal and a dependent coordinate boundary crossing signal, said producing means receiving a first coordinate boundary crossing signal, a second coordinate boundary crossing signal and being operatively connected with said slope comparing means;

- a dependent variable control comprising an up/down counter means including an up gate for causing the counter to increase its stored count by one count, a down gate for causing the counter to decrease a positive stored count by one count and an output on which a pulse is conveyed out in response to each decrease of a positive stored count by one count, said up gate operatively connected to said first producing means to receive the independent coordinate boundary crossing signal, said down gate operatively connected to said first producing means to receive the dependent coordinate boundary crossing signal;
- a second producing means for producing an independent coordinate boundary crossing signal, a first coordinate boundary crossing signal and a second coordinate boundary crossing signal, said second producing means operatively connected with said counter output and operatively connected with said first producing means to receive said independent coordinate boundary crossing means and an indication which of said first and second coordinates is the independent variable whereby the independent coordinate boundary crossing signal from said first producing means forms the independent coordinate boundary crossing signal and one of said first and second coordinate boundary crossing signals and pulses from the counter output form the other of said first and second coordinate boundary crossing signals; and
- wherein said second producing means is operatively connected with said buffer for supplying independent first and second coordinate boundary crossing signals thereto.

9. A diagnostic scanner display apparatus for displaying various physical properties within an examined region of an object comprising:

- receiving means including means for receiving a series of diagnostic values each representing the property of a subregion of an object examined at a position within a region examined; and means for receiving a series of analog position signals indicative of coordinate positions of the subregion within the region represented by a contemporaneously received diagnostic value;
- position conversion means operatively connected with said receiving means for altering the scale of said analog position signals comprising a first scaling factor source adapted to provide a plurality of scaling factors, first addressable selection means for selecting one of the plurality of scaling factors, said first addressable selection means operatively connected with said scaling factor source, first address means for addressing said first addressable selection means for causing selection of a one of said scaling factors, said first address means operably connected with said first addressable selecting means, combining means for multiplicatively combining a selected scaling factor with said position signals to produce scaled position signals, said combining means operatively connected with said receiving means and said first addressable selection means;
- analog-to-digital conversion means for converting said scaled position signals to digital position signals, said analog-to-digital conversion means operatively connected with said first combining means;
- second address means for transforming said digital position signals to memory addresses, said second address means operatively connected with said analog-to-digital conversion means;
- memory means for storing each diagnostic value at memory address scaled and transformed from an analog position signal contemporaneously received with each diagnostic value, said memory means operatively connected with said receiving means and said second address means; and
- display means for transforming diagnostic values stored in said memory means in a visual display, said display means operatively connected with said memory whereby said visual display is indicative of variations in a physical property of a region of the examined object.

10. The apparatus as set forth in claim 9 wherein said physical property is accoustic reflectivity.

11. The apparatus as set forth in claim 9 wherein said position conversion means further includes a continuously variable source of scaling factors; an altering means for altering the scaling factors from said continuously variable source of scaling factors to produce a plurality of altered scaling factors, said altering means operatively connected with said continuously variable source of scaling factors; second addressable selecting means for selecting one of said altered scaling factors, said second addressable selecting means operatively connected with said said first address means and said altering means; said combining means further operatively connected with said second addressable selecting means for combining said selected altered scaling factor with said selected scaling factor and said position signals.

12. The apparatus as set forth in claim 11 further including box generating means operatively connected with said second addressable selecting means and said display means for generating a rectangle on the display with a scale determined by said selected altered scaling factor.

13. In an ultrasonic diagnostic scanning device including a transducer for transmitting accoustic waves along a path and receiving accoustic echoes along said path, means for producing an indication of the position and orientation of the transducer, and a memory for storing diagnostic data from the accoustic echoes, a memory addressing system comprising:

- means for determining a starting coordinates for at least one accoustic wave, said starting coordinate determining means operatively connected with said indication producing means;
- means for determining the rate of change of said path relative to each of at least two coordinate axes, said rate of change determining means operatively connected with said indication producing means, the coordinate axes relative to which the rate of change is most rapid being the independent;

means for determining the relative rate of change between the rate of change of said path relative to one coordinate axis and the rate of change of said path relative to another coordinate axis;

means for generating a first address, said first address generating means operatively connected to said indication producing means;

first means for modifying addresses to generate a second and subsequent addresses corresponding to changes relative to the coordinate axis with respect to which the rate of change of said path is greater, said first modifying means operatively connected with said rate determining means and means for indicating travel of accoustic waves along said path whereby each time the echoes from along said path originate a predetermined distance further relative to said coordinate to which the rate of change is greater, an address is generated;

second means for modifying addresses corresponding to changes relative to the coordinate axis with respect to which the rate of change is lesser, said second modifying means being operatively connected with said first modifying means and said relative rate of change determining means, said second modifying means modifying addresses relative said first modifying means at the rate of the relative rate of change determined by the relative rate of change determining means.

14. An ultrasonic scanner comprising a transducer for emitting accoustic waves into a planar region of a patient, said region defined by an array of subregions defined by subregion boundaries, said accoustic waves as they progress through said array of subregions being reflected from tissue and interfaces in said region to original echoes, said transducer receiving said echoes to produce diagnostic data; means for producing an indication of the position and angular orientation of said transducer; an addressable memory and further comprising:

means for generating a memory address comprising a first up/down counter means for generating a first part of said address and a second up/down counter means for generating a second part of said address;

means for presetting said first and second up/down counter means for each accoustic transmission, said presetting means operatively connected with said transducer position indicating means; and means for stepping said first and second up/down counter means in response to each crossing of a subregion boundary along respective first and second coordinate directions by the origin of received accoustic echoes.

15. The ultrasonic scanner as set forth in claim 14 wherein said stepping means comprises:

means for determining subregion boundary crossing relative to said first coordinate direction;

means for determining subregion boundary crossing relative to said second direction;

means for receiving diagnostic data, the determination of a subregion boundary crossing relative to said first coordinate direction, and the determination of a subregion boundary crossing relative to said second coordinate direction, said receiving means operatively connected with said transducer and said first and second subregion boundary crossing determining means;

buffer memory means for storing a series of indicia each indicia consisting of diagnostic datum and any generally contemporaneously received subregion boundary crossing determinations; said buffer memory operatively connected with said receiving means;

multiplexer means for separating diagnostic data from subregion boundary crossing determinations whereby diagnostic data may be conveyed to said addressable memory; said multiplexer means operatively connected with said buffer memory means; and means for generating stepping signals for said first and second up/down counter means in response to said boundary crossing determinations relative to said first and second coordinate directions, respectively; said stepping signal generating means operatively connected with said multiplexer means and said first and second up/down counter means.

16. The ultrasonic scanner as set forth in claim 15 wherein said buffer memory means includes a first buffer memory and a second buffer memory and control means for controlling said first and second buffer memories such that alternately one receives new data as the other transfers data to said addressable memory.

17. The ultrasonic scanner as set forth in claim 14 wherein said addressable memory is a $640 \times 512$ memory.

18. The ultrasonic scanner as set forth in claim 15 further including:

comparator means for determining the relative rate of subregion boundary crossing relative to said first and second coordinate directions;

third up/down counter means for counting up with each boundary crossing determination relative to the coordinate direction relative to which the rate of subregion boundary crossing is slower and counting down if the stored count is greater than zero, with each boundary crossing determination relative to the coordinate direction relative to which the rate of subregion boundary crossing is faster; said third up/down counter means operatively connected with said comparator means, said first and second subregion boundary crossing determining means to receive signals therefrom and with said receiving means for supplying the determination of a subregion boundary crossing relative to the coordinate direction relative to which the rate of subregion boundary crossing is the slower whereby down counts of the third up/down counter supply one of the determinations of subregion boundary crossing to said receiving means.

* * * * *